United States Patent Office 2,859,098
Patented Nov. 4, 1958

2,859,098

PROCESS FOR THE SEPARATION OF COLUMBIUM, TANTALUM, AND TITANIUM VALUES

John R. Ruhoff and George L. Martin, Webster Groves, and Charles O. Gerfen, Brentwood, Mo., assignors to Mallinckrodt Chemical Works, St. Louis, Mo., a corporation of Missouri No Drawing. Application February 15, 1955
Serial No. 488,402

4 Claims. (Cl. 23—23)

This invention relates to a separation process and more particularly to a process for separating columbium and/or tantalum, individually or together, from mineral concentrates.

Briefly, the present invention is directed to the method of upgrading a columbium and/or tantalum-containing concentrate by recovering values of these elements from a concentrate containing a compound of at least one of said elements and a compound of an element of group IV B of the periodic table, which comprises adjusting the fluoride concentration of a mixture of said compounds to effect the separation of at least one of said columbium and tantalum values from the compound of the group IV B element.

Among the several objects of this invention are the provision of methods for separating columbium and tantalum values, individually or together, from mineral concentrates containing compounds of these elements associated with a compound of an element of group IV B of the periodic table, such as titanium; the provision of methods which yield columbium and tantalum values in reactive and readily usable form; the provision of methods for separating columbium and tantalum values from the group IV B elements which employ inexpensive and readily available chemical reagents; and the provision of methods for separating columbium and tantalum values from titanium compounds which do not require prior reduction of titanium to a valence state lower than that in which it normally is found in ores. Other objects and features will be in part apparent and in part pointed out hereinafter.

The invention accordingly comprises the methods hereinafter described, the scope of the invention being indicated in the following claims.

Some minerals containing columbium and tantalum values also contain titanium compounds and may contain other compounds of elements from group IV B of the periodic table. However, the chemical methods heretofore available for separating columbium and tantalum values, individually or together, from concentrates containing compounds of elements of group IV B of the periodic table have been inefficient, or required the use of expensive chemical reagents, or required prior reduction of the titanium to a lower valence state in order to increase its solubility.

In accordance with the present invention, it has now been found that columbium and tantalum values can be conveniently and economically separated from each other and from titanium and other elements of group IV B of the periodic table by precipitating them from a solution of their fluocomplexes, using the hydrous oxide of an element, such as titanium, from group IV B of the periodic table as the precipitating agent. Tantalum can be individually precipitated as its hydrous oxide by adding hydrous titanium oxide to a solution of the fluocomplexes of tantalum, columbium and an element of group IV B of the periodic table in a quantity not exceeding that required to displace tantalum from its fluocomplex (including that necessary to react with any free fluoride or impurities which may be displaced by hydrous titanium oxide or which may have been present initially). After tantalum values have been removed, the columbium values can be displaced and precipitated as the hydrous oxide in like manner by the addition of further amounts of hydrous titanium oxide, but the additional hydrous titanium oxide should not substantially exceed that required to displace the columbium. If compounds of other elements (such as iron) which are displaced by titanium are present, appropriate allowance should be made in the amount of hydrous titanium oxide added. Compounds of such elements can be easily removed from the precipitate by conventional methods.

Hydrous titanium oxide is the preferred precipitating agent since it is inexpensive and readily available and because titanium is often associated with columbium and tantalum. It can, for example, readily be obtained by adding a base, such as ammonia or an alkali hydroxide, to a solution of titanium fluocomplex remaining after separation of the columbium and tantalum as described above to decompose the complex and precipitate hydrous titanium oxide.

The process of the present invention also includes treating a mixture of the hydrous oxides of columbium, tantalum and an element of group IV B of the periodic table with fluoride sufficient to form the fluocomplex of the group IV B element, but insufficient to form tantalum or columbium fluocomplexes. In that case, the hydrous oxide of the group IV B element is selectively dissolved from the mixture of hydrous oxides, but the principle for separating values of the elements is the same as that described above.

In carrying out the present invention, the fluoride ion concentration is adjusted to be equivalent to the amount of titanium present in the mixture. In general, it is preferred that the process be carried out at a pH of approximately 2–7. At a pH of approximately 2–4, the titanium tends to be present as $TiF_6^=$. The proportion of fluoride ions in the mixture is computed accordingly in determining the equivalent. At a pH of approximately 5 and above, the titanium tends to be present as $TiOF_4^=$ and the equivalent is computed on this basis. At a pH above approximately 7, $TiOF_4^=$ is not stable in the absence of excess fluoride. Therefore, if the process is to be operated at a pH above approximately 7, fluoride ions in addition to the equivalent amount must be present.

If the mixture to be treated contains the fluocomplexes of columbium and/or tantalum together with the fluocomplexes of a group IV B element, the present process can be carried out by the addition of a suitable proportion of the hydrous oxide of a group IV B metal, such as titanium. The amount of such hydrous oxide added is determined upon the basis stated in the preceding paragraph. The hydrous oxide of the group IV B element added displaces the columbium and/or tantalum values from solution, thereby precipitating the hydrous oxides of one or both of these elements. The group IV B element remains in solution as its fluocomplex.

Alternatively, mixtures of the hydrous oxides of columbium and/or tantalum with a hydrous oxide of a group IV B element may be separated by adding to the mixture a source of fluoride ions, the proportion thereof being determined as outlined above, and adjusting so that the final pH is as stated above. A fluocomplex of the group IV B element is thereby formed which is water soluble and may, therefore, be selectively dissolved from the mixture. It will be noted that in this instance the resulting products are of the same character as outlined in the preceding paragraph, and they are obtained by reason of the same chemical principles.

For maximum recovery of columbium and/or tantalum, the fluoride ions present in solution should not be in excess of that amount equivalent to the group IV B element, since otherwise the recovery is less complete. Also, the process should be operated at a pH of approximately 5–7. If maximum purity of columbium and/or tantalum is desired, the process should be carried out at a pH of approximately 2–4 and the fluoride ions in solution should be present in an amount at least equivalent to the group IV B element. In this case, maximum recovery of columbium and/or tantalum from the group IV B metal may not be attained, but the solution resulting may be recycled for the recovery of additional columbium and/or tantalum. If the process is carried out at a low pH, e. g. 2, and an amount of fluoride ions at least equivalent to the group IV B element is present in the mixture, a columbium and/or tantalum precipitate of high purity is obtained, although the yield of columbium and/or tantalum recovered may be somewhat decreased. The fluoride ion concentration should always be less than the equivalent amount necessary to dissolve the hydrous oxides of all elements present.

While the method of the present invention is especially useful to individually sequentially separate columbium and tantalum values from a concentrate solution containing compounds of these elements together with a compound of titanium or other elements from group IV B of the periodic table, it can also be used to separate either columbium or tantalum values from concentrates containing either of these values together with one or more compounds of group IV B elements.

It is often advantageous to heat the mixture while carrying out the process so as to increase the solubility of the fluocomplexes and make it possible to work with more concentrated solutions. Also, although alkali metal hydroxides can be used for adjusting the pH of the mixture, ammonia is usually preferred since the ammonium salts are more soluble.

The following examples illustrate the invention.

Example 1

A mixture of the hydrous oxides of columbium and titanium (equivalent to 3.6 g. $Cb_2O_5$ and 3.6 g. $TiO_2$) was suspended in water (100 ml.) and to this were added potassium ions and fluoride ions equivalent to the formation of $K_2TiF_6$ plus an 11.1% excess of fluoride (8.5 g. $KF \cdot 2H_2O$ and 8.0 ml. 48% hydrofluoric acid). The pH was adjusted to approximately 2 with hydrochloric acid, and the mixture was stirred for several hours. The solid phase then contained 60% of the columbium initially present, and the ratio of columbium oxide to titanium dioxide in the solid phase (expressed as $Cb_2O_5/TiO_2$) was 8.3 to 1, compared to the initial ratio of 1 to 1.

Example 2

Example 1 was repeated except that the excess fluoride was reduced to 10.8%. This time, 80% of the columbium was recovered in the solid phase and the ratio of columbium oxide to titanium dioxide was 6.1 to 1.

Example 3

A mixture of hydrous oxides of columbium and titanium (equivalent to 8.4 g. $Cb_2O_5$ and 2.8 g. $TiO_2$) was suspended in water (200 ml.) and to this were added potassium ions and fluoride ions equivalent to $K_2TiF_6$ plus a 5.5% excess of fluoride (6.6 g. $KF \cdot 2H_2O$ and 5.5 ml. 48% hydrofluoric acid). The pH was adjusted to approximately 2 with hydrochloric acid, and the mixture was stirred for several hours. The solid phase then contained 90% of the columbium initially present, and the ratio of columbium oxide to titanium dioxide was 9.3 to 1, compared to the initial ratio of 3 to 1.

Example 4

A mixture of the hydrous oxides of columbium and titanium (equivalent to 8.4 g. $Cb_2O_5$ and 2.8 g. $TiO_2$) was suspended in water (200 ml.) and to this were added ammonium ions and fluoride ions equivalent to $(NH_4)_2TiF_6$ plus a 5.5 excess of fluoride (5.2 g. $NH_4HF_2$ and 1.4 ml. 48% hydrofluoric acid). The pH was adjusted to approximately 2 with hydrochloric acid and the mixture was stirred for several hours. The solid phase then contained 80% of the columbium initially present, and the ratio of columbium oxide to titanium dioxide was 18 to 1, compared to the initial ratio of 3 to 1.

Example 5

To an aqueous solution (200 ml.) of the fluocomplexes of columbium and tantalum containing 33.4 g./liter of fluoride (expressed as $NH_4HF_2$), 25.0 g./liter of columbium (expressed as $Cb_2O_5$) and 5.0 g./liter of tantalum (expressed as $Ta_2O_5$) was added hydrous titanium oxide so that the mixture contained 20.0 g./liter of titanium (expressed as $TiO_2$). After vigorous agitation for one hour, the mixture was filtered. The columbium-tantalum content of the precipitate (expressed as $(Cb,Ta)_2O_5$) was 5.78 g., which represented a 96.5% yield. The ratio of columbium-tantalum oxide to titanium dioxide in the precipitate was 4.3 to 1, compared to the initial ratio in the mixture of 1.5 to 1.

Example 6

To an aqueous solution (250 ml.) of the fluocomplex of columbium containing 24.0 g./liter of fluoride (expressed as $NH_4HF_2$) and 20.0 g./liter of columbium (expressed as $Cb_2O_5$) was added hydrous titanium oxide so that the mixture contained 16.0 g./liter of titanium (expressed as $TiO_2$). After vigorous agitation for one hour, the mixture was filtered. The columbium content of the precipitate (expressed as $Cb_2O_5$) was 4.92 g., which represented a 98.4% yield. The ratio of columbium oxide to titanium dioxide was 4.08 to 1, compared to the initial ratio in the mixture of 1.25 to 1.

Example 7

To an aqueous solution (200 ml.) of the fluocomplexes of columbium and tantalum containing 72.5 g./liter of fluoride (expressed as $NH_4HF_2$), 25.0 g./liter of columbium (expressed as $Cb_2O_5$), and 25.0 g./liter of tantalum (expressed as $Ta_2O_5$) was added hydrous titanium oxide so that the mixture contained 20.0 g./liter of titanium (expressed as $TiO_2$). The pH of the mixture was adjusted to approximately 4.0, and the mixture was stirred vigorously for one hour and filtered. The tantalum content of the precipitate (expressed as $Ta_2O_5$) was 3.56 g., which represented a 71.2% yield of the tantalum originally in solution. The ratio of tantalum oxide to columbium oxide was 2.25 to 1, compared to the initial ratio in the mixture of 1.0 to 1. To the filtrate of the fluocomplexes of columbium and tantalum containing 72.5 g./liter of fluoride (expressed as $NH_4HF_2$), 17.1 g./liter of columbium (expressed as $Cb_2O_5$), 7.2 g./liter of tantalum (expressed as $Ta_2O_5$), and 19.5 g./liter of titanium (expressed as $TiO_2$) was added a further amount of hydrous titanium oxide so that the mixture contained 39.5 g./liter of titanium (expressed as $TiO_2$). The pH was adjusted to approximately 6.0, and after vigorous stirring for one hour the mixture was filtered. The columbium content of the precipitate (expressed as $Cb_2O_5$) was 1.81 g., which represented a 52.8% yield. The ratio of columbium oxide to tantalum oxide was 2.67 to 1, compared to the initial ratio in the mixture which was 1 to 1.

It is to be understood that any convenient source of fluoride ions, such as hydrofluoric acid or one of its water-soluble salts, may be used in the practice of the present invention.

In view of the above, it will be seen that the several objects of the invention are achieved and other advantageous results attained.

As various changes could be made in the above methods without departing from the scope of the invention, it is

We claim:

1. The method of recovering columbium and tantalum values from a concentrate containing compounds of said elements and an element of group IV B of the periodic table, comprising adding the hydrous oxide of a group IV B element to a solution of said concentrate containing the fluocomplexes of columbium, tantalum and the group IV B element while maintaining the pH at a value between approximately 2–7 to precipitate hydrous oxides of columbium and tantalum.

2. The method of separately recovering columbium and tantalum values from a concentrate containing compounds of said elements and an element of group IV B of the periodic table, comprising adding the hydrous oxide of a group IV B element to a solution of said concentrate containing the fluocomplexes of columbium, tantalum and the group IV B element while maintaining the pH at a value between approximately 2–7 to sequentially precipitate hydrous oxides of tantalum and columbium.

3. The method of separately recovering columbium and tantalum values from a concentrate containing compounds of said elements and titanium, comprising adding the hydrous oxide of titanium to a solution of said concentrate containing the fluocomplexes of columbium, tantalum and titanium to effect the precipitation of the hydrous oxide of tantalum, and adding an additional amount of the hydrous oxide of titanium to effect the precipitation of the hydrous oxide of columbium, the pH of the solution being maintained at a value between approximately 2–7.

4. The method of separately recovering columbium and tantalum values from a concentrate containing compounds of said elements and titanium, comprising adding the hydrous oxide of titanium to a solution of said concentrate containing the fluocomplexes of columbium, tantalum and titanium in an amount not substantially in excess of that required to decompose the tantalum fluocomplex to effect the precipitation of the hydrous oxide of tantalum, and adding the hydrous oxide of titanium in an additional amount not substantially in excess of that required to decompose the columbium fluocomplex to effect the precipitation of the hydrous oxide of columbium, the pH of the solution being maintained at a value between approximately 2–7.

References Cited in the file of this patent

UNITED STATES PATENTS

| | | |
|---|---|---|
| 1,618,960 | Coster et al. | Feb. 22, 1927 |
| 1,802,242 | Finck et al. | Apr. 21, 1931 |
| 1,908,473 | Cunningham et al. | May 9, 1933 |
| 2,418,073 | Kawecki | Mar. 25, 1947 |
| 2,537,316 | Oppegaard et al. | Jan. 9, 1951 |

OTHER REFERENCES

Journal of the Chem. Soc., April 1952, pages 1497–1504.

Journal of Am. Chem. Soc., vol. 73 (January 1951), pages 9–15.

Chem. Abs., 49, 1461 (February 10, 1955).

Chem. Abs., 23, 4640 (1929).

Chem. Abs., 41, 4733 and 4734 (1947).

Chem. Abs., 45, 4524 (1951).